(12) United States Patent
Guim Bernat

(10) Patent No.: US 11,340,832 B2
(45) Date of Patent: May 24, 2022

(54) CONCEPT FOR CONTROLLING A MEMORY PERFORMANCE IN A COMPUTER SYSTEM

(71) Applicant: Intel Corporation, Santa Clara, CA (US)

(72) Inventor: Francesc Guim Bernat, Barcelona (ES)

(73) Assignee: INTEL CORPORATION, Santa Clara, CA (US)

( * ) Notice: Subject to any disclaimer, the term of this patent is extended or adjusted under 35 U.S.C. 154(b) by 102 days.

(21) Appl. No.: 16/537,649

(22) Filed: Aug. 12, 2019

(65) Prior Publication Data

US 2021/0048958 A1   Feb. 18, 2021

(51) Int. Cl.
*G06F 3/06* (2006.01)
*G06F 13/16* (2006.01)

(52) U.S. Cl.
CPC .......... *G06F 3/0659* (2013.01); *G06F 3/0604* (2013.01); *G06F 3/0673* (2013.01); *G06F 13/1668* (2013.01)

(58) Field of Classification Search
CPC .... G06F 3/0659; G06F 3/0604; G06F 3/0673; G06F 13/1668
See application file for complete search history.

(56) References Cited

U.S. PATENT DOCUMENTS

| | | | |
|---|---|---|---|
| 10,282,107 B1 * | 5/2019 | Martin | G06F 3/0611 |
| 10,621,118 B1 * | 4/2020 | Iyer | G06F 13/1668 |
| 2015/0279461 A1 * | 10/2015 | Chinnakkonda Vidyapoornachary | G11C 7/1072 711/105 |

* cited by examiner

*Primary Examiner* — Eric Cardwell
(74) *Attorney, Agent, or Firm* — 2SPL Patent Attorneys PartG mbB; Yong Beom Hwang

(57) ABSTRACT

Examples relate to a processor apparatus, device, method and computer program, to a memory performance controller apparatus, device, method and computer program and to a memory controller apparatus, device, method and computer program. The processor apparatus comprises interface circuitry for communicating with other components of the computer system. The processing circuitry is configured to provide an interface for controlling a memory performance requirement of a data structure stored within a memory of the computer system. The memory performance requirement is a percentile-based memory performance requirement comprising at least a first memory performance requirement valid for a first portion of access operations and a second memory performance requirement valid for a second portion of access operations. The processing circuitry is configured to control a memory system of the computer system to provide the memory performance indicated by the memory performance requirement in response to an instruction obtained via the interface for controlling the memory performance requirement of the data structure.

21 Claims, 7 Drawing Sheets

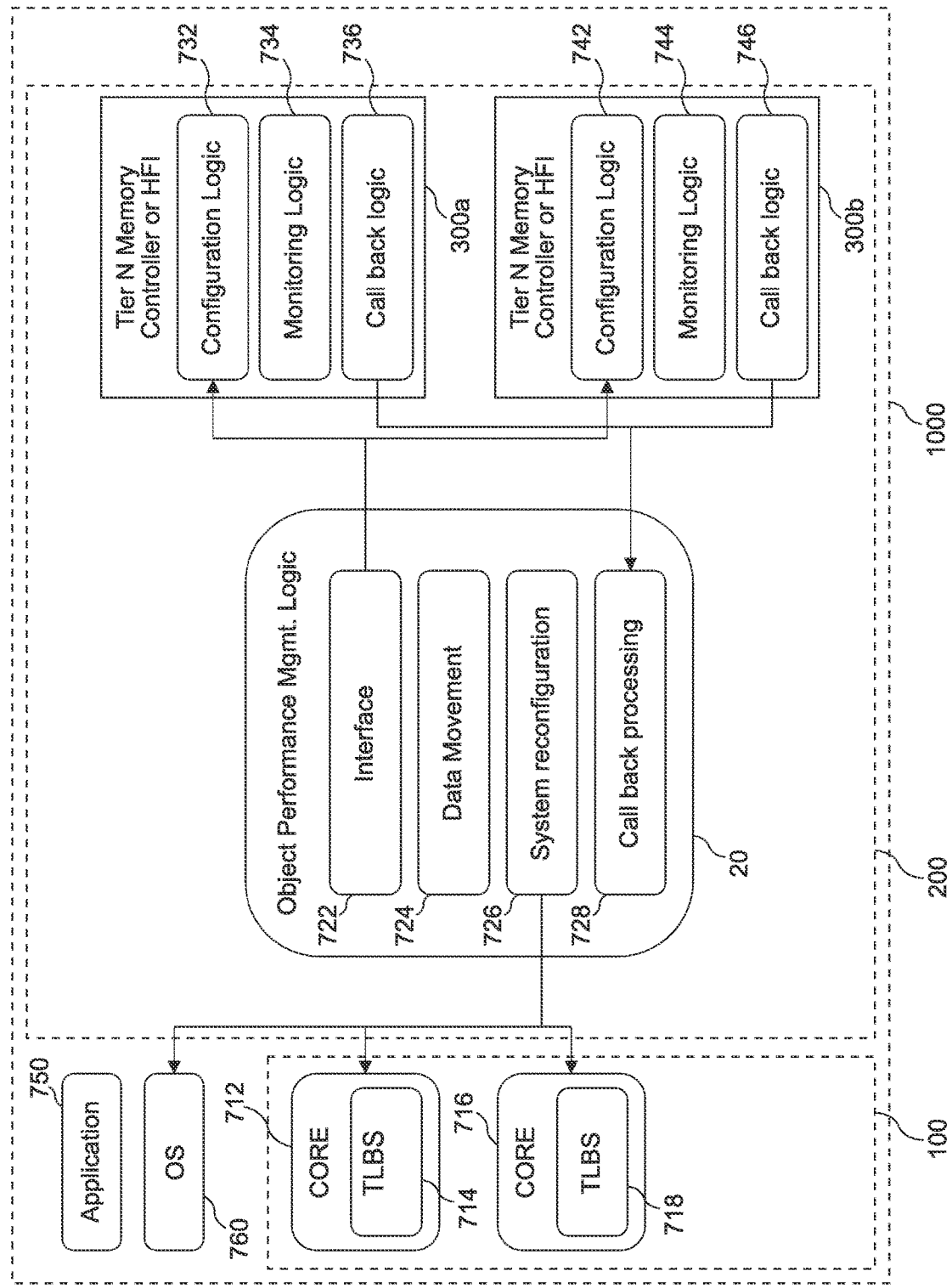

US 11,340,832 B2

CONCEPT FOR CONTROLLING A MEMORY PERFORMANCE IN A COMPUTER SYSTEM

FIELD

Examples relate to a processor apparatus, device, method and computer program, to a memory performance controller apparatus, device, method and computer program and to a memory controller apparatus, device, method and computer program.

BACKGROUND

The memory performance that is available for different applications in a computer system may influence an overall performance of the respective applications. In some cases, applications may have memory performance requirements that are to be satisfied by a memory system of the computer system to ensure that the applications work as expected.

BRIEF DESCRIPTION OF THE FIGURES

Some examples of apparatuses and/or methods will be described in the following by way of example only, and with reference to the accompanying figures, in which

FIG. 7 shows a schematic diagram of an object performance management logic.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1A:
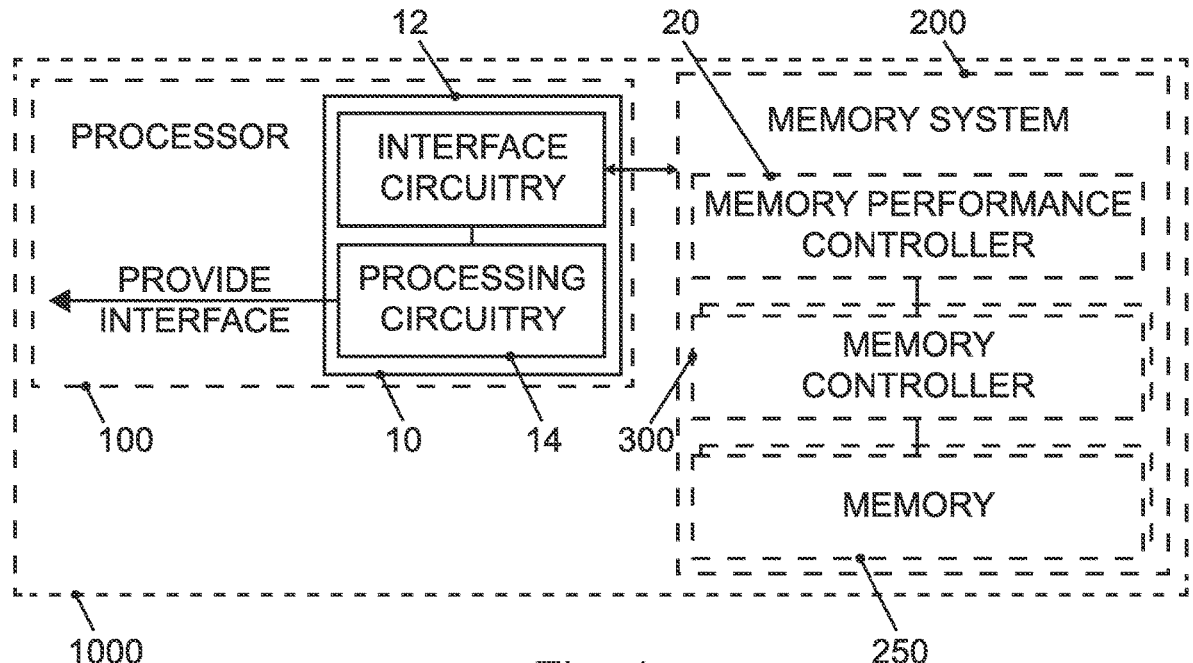
FIG. 1a shows a block diagram of an example of a processor apparatus or processor device for a processor of a computer system.

FIG. 1a shows a block diagram of an example of a processor apparatus 10 or processor device 10 for a processor 100 of a computer system 1000. The components of the processor device 10 are defined as component means, which correspond to the respective structural components of the processor apparatus 10. The processor apparatus or processor device 10 comprises interface circuitry/means for communicating 12 for communicating with other components of the computer system. The processor apparatus or processor device 10 comprises processing circuitry/means for processing 14 that is coupled to the interface circuitry 12 (or means for communicating 12). The processing circuitry 14 is configured to provide an interface for controlling a memory performance requirement of a data structure stored within a memory of the computer system. The memory performance requirement is a percentile-based memory performance requirement comprising at least a first memory performance requirement valid for a first portion of access operations and a second memory performance requirement valid for a second portion of access operations. The processing circuitry is configured to control a memory system 200 of the computer system to provide the memory performance indicated by the memory performance requirement in response to an instruction obtained via the interface for controlling the memory performance requirement of the data structure. FIG. 1a further shows the processor 100 comprising the processor apparatus 10. FIG. 1a further shows the computer system 1000 comprising the processor 100 and the memory system 200.

Figure 1B:
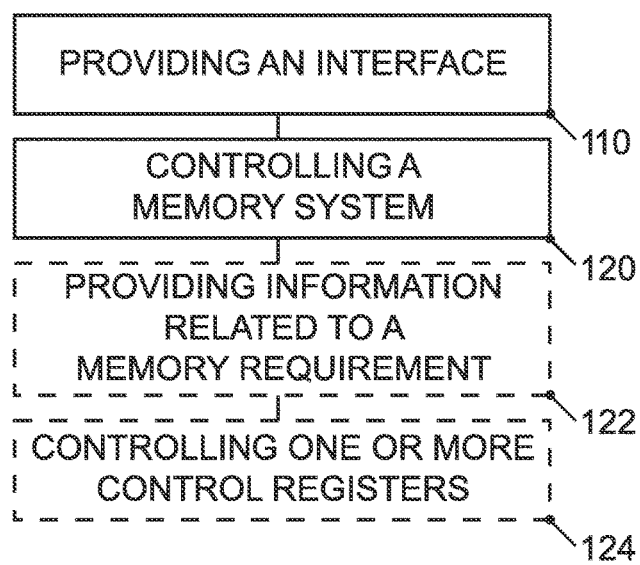
FIG. 1b shows a flow chart of an example of a processor method for a processor of a computer system.

FIG. 1b shows a flow chart of an example of a (corresponding) processor method for the processor 100 of the computer system 1000. The method comprises providing 110 an interface for controlling a memory performance requirement of a data structure stored within a memory of the computer system. The memory performance requirement is a percentile-based memory performance requirement comprising at least a first memory performance requirement valid for a first portion of access operations and a second memory performance requirement valid for a second portion of access operations. The method comprises controlling 120 a memory system 200 of the computer system to provide the memory performance indicated by the memory performance requirement in response to an instruction obtained via the interface for controlling the memory performance requirement of the data structure. For example, the processor method may be executed by the processor 100, e.g. by the processor apparatus or device 10 of the processor 100.

The following description relates to the processor apparatus/device 10 of FIG. 1a and to the corresponding method of FIG. 1b.

At least some examples relate to a processor apparatus, device and method for a processor. Accordingly, the processor apparatus, device and method may provide a part of a functionality of the processor, e.g. a part of the functionality of the processor that relates to controlling the memory performance. For example, the processor 100 may be a general-purpose processor, e.g. the Central Processing Unit (CPU) of the Computer System. The Processor 100 may comprise one or more processor cores. Each of the processor cores may comprise a processor apparatus or device 10, or may be configured to execute the corresponding method.

The processor 100 is a processor of the computer system 1000. In examples, the computer system may be a desktop computer system, such as a desktop computer, a laptop computer or a workstation. Alternatively, the computer system may a server computer system, e.g. a server comprising a single node or a server system comprising a plurality of nodes. In such cases, the memory system of the computer system may be connected to the processor 100 using a network fabric of the computer system 100. For example, the computer system/server 100 may be an edge device/server or a computer system comprising an edge device, or a server of a micro datacenter or central office.

The processing circuitry is configured to provide the interface for controlling a memory performance requirement of a data structure stored within a memory of the computer system. For example, the interface for controlling the memory performance requirement of the data structure may be provided to one or more (software) applications being executed by the processor, e.g. via an operating system of the computer system. The interface may be provided via an instruction set of the processor. In other words, the interface for controlling the memory performance requirement of the data structure may be provided as part of an instruction set of the processor 100. Applications being executed on the processor may take advantage of the interface via the instruction set of the processor. Alternatively, the interface may be provided via one or more MSRs (Machine State Register) of the processor 100, which may be changed by the processor apparatus/device 10. For example, the interface for controlling the memory performance requirement of the data structure may provide the operating system of the computer system with a way for controlling the memory performance requirement of the data structure. In this context, the term "control" may comprise setting, adjusting, updating and/or removing the memory performance requirement of the data structure. In order to control the memory performance requirement, one or more instructions may be received via the interface, e.g. from the one or more applications (e.g. via the operating system) and/or from the operating system. For example, the one or more applications may have access to the data structure, i.e. the data structure may be stored within memory that is allocated to or accessible by the one or more applications.

In at least some examples, the data structure is an interrelated set of data, e.g. an interrelated set of data that is accessible by one or more applications being executed by the processor. For example, the data structure may be (part of) a file or data structure of a database of a database system, or may be a data structure used for caching of content (of the one or more applications). In examples, the data structure is characterized by having a memory performance requirement, such as a maximal (write and/or read) latency and/or a minimal (write and/or read) throughput. Accordingly, the memory performance requirement might relate to at least one of a required minimal (write and/or read) throughput and a required maximal (write and/or read) latency for accessing the data structure.

The memory performance requirement is a percentile-based memory performance requirement. In other words, the memory performance requirements may comprise a plurality of sub-memory requirements that are each applicable/valid for a portion of access operations to the data structure. In general, the memory performance requirement comprises at least a first memory performance requirement valid for a first portion of access operations (accessing the data structure) and a second memory performance requirement valid for a second portion of access operations (accessing the data structure). In some examples, the memory performance requirement may further comprise a third memory performance requirement valid for a third portion of access operations, or a third and a fourth memory performance requirement valid for a third and fourth portion of access operations. For example, the memory performance requirement may comprise a first memory performance requirement that applies/is valid for 50% of access operations, and a second performance requirement that applies/is valid for the other 50% percent of access operations. Alternatively, a nested or hierarchical approach may be chosen: In this case, for example, the memory performance requirement may comprise a first memory performance requirement that applies/is valid for 50% of access operations, and a second performance requirement that applies/is valid for 80% of access operations, the 80% comprising the 50% of the first memory performance requirement. Consequently, the second performance requirement may be less stringent (e.g. allowing for a higher maximal latency and/or a lower throughput) than the first memory performance requirement. In other words, the second portion may comprise the first portion. In other words, a nested or hierarchical percentile-based memory requirement may be used, where the first portion applies to a smaller portion of access operations, and the second portion applies to a larger portion of access operations that comprise the first portion, where the memory performance requirements of the second portion (which may be less stringent than those of the first portion) may also apply to the first portion. The first memory performance requirement may be more stringent than the first memory performance requirement. In at least some examples, the memory performance requirement may be denoted or likened to a Service Level Agreement (SLA), i.e. an agreement for providing a certain level of memory performance (i.e. the service).

The processing circuitry is configured to control the memory system 200 of the computer system to provide the memory performance indicated by the memory performance requirement in response to an instruction obtained via the interface for controlling the memory performance requirement of the data structure, e.g. after obtaining the instruction via the interface for controlling the memory performance requirement of the data structure. For example, the instruction may be obtained from an application being executed by the processor. By controlling the memory system using a percentile-based memory performance requirement, a more flexible control of the memory performance is supported, which enables a memory performance requirement-compliant access to the data structure in homogeneous or heterogeneous memory architectures.

In examples, the memory system 200 of the computer may comprise various components, such as memory 250, one or more memory controllers 300 being associated with the memory 250, and, optionally, a memory performance controller apparatus or device 20. For example, a plurality of different types of memory 250 may be used in the computer system 1000. For example, the memory 250 may comprise volatile memory, such as Random Access Memory (RAM), persistent memory (such as Intel® 3D XPoint™) or non-volatile memory, e.g. memory provided via Non-Volatile Memory express (NVMe)-based solid state drives. Intel and 3D XPoint are trademarks of Intel Corporation or its subsidiaries in the U.S. and/or other countries. In some examples, the memory system 200 may be connected to the processor 100 using a computer-system processor interconnect, such as QuickPath Interconnect or Ultra Path Interconnect (UPI), or Hypertransport. Additionally or alternatively, the memory system 200 may be connected to the processor 100 via a computer-system internal network or network fabric, e.g. via a Network Interface Card (NIC), which may be implicitly comprised in another component.

In order to control the memory system 200 of the computer system, the processing circuitry may either directly control the one or more memory controllers, e.g. by setting their control registers, or by delegating the control to the memory system 200, e.g. the memory performance controller apparatus/device 20 of the memory system 200. In other words, the memory system may comprise a controller, such as the memory performance controller apparatus/device 20, which is suitable for controlling the memory performance, and which may be used to control the memory system 200 of the computer system to provide the memory performance indicated by the memory performance requirement.

For example, in order to control the memory system 200 of the computer system to provide the memory performance indicated by the memory performance requirement, the processing circuitry 14 may be configured to provide 122 information related to the memory performance requirement of the data structure to the memory system 200 of the computer system to control the memory system 200 of the computer system. For example, the information related to the memory performance requirement may comprise the percentile-based memory performance requirement. In other words, the information related to the memory performance requirement may comprise the memory performance requirement in a percentile-based format. More specifically, in order to control the memory system 200 of the computer system to provide 122 the memory performance indicated by the memory performance requirement, the processing circuitry 14 may be configured to provide the information related to the memory performance requirement of the data structure to a memory performance controller apparatus 20 of the memory system 200. Alternatively, the information related to the memory performance requirement may be provided (directly) to the one or more memory controllers, e.g. as configuration settings to be stored in control registers of the one or more memory controllers. In other words, controlling the memory system 200 comprises controlling 124 one or more control registers of one or more memory controllers of the memory system 200 based on the memory performance requirement. By controlling the registers of the memory controllers, memory performance may be allocated to the data structure by the memory controller being associated with the memory comprising the data structure. If the memory performance controller apparatus or device is involved, the one or more control registers may be controlled by the memory performance controller apparatus or device based on the information related to the memory performance requirement.

In some cases, the data structure may occupy an entire portion of the memory, i.e. the data structure may be contiguously (i.e. continuously, without interruption) stored within the portion of the memory. In many cases, this is not the case, e.g. if the one or more applications use multiple data structures, of which only one or some have memory performance requirements, or if the data structure is expanding over time and no contiguous portion of memory is available. In such cases, the data structure may be non-contiguously stored within the memory of the computer system. In other words, the data structure may be stored such, that if the portion of the memory comprising the data structure comprises three consecutive sub-portions, the data structure is stored within the first and third sub-portion and data that is not part of the data structure is stored in the second sub-portion. This may enable storing the data structure within memory associated with different memory controllers, or spread over memory that comprises the data structure and additional data (e.g. of an application having access to the data structure).

In such cases, a location of the data structure within the memory is specified by the information related to the required memory performance of the data structure using information about a contiguous memory range comprising the data structure and using bitmap information that specifies a non-contiguous location of the data structure within the contiguous memory range. For example, the information about the contiguous memory range comprising the data structure may comprise information on a starting address and information about an end address or information about a size of the contiguous memory range. The bitmap information may specify which parts of the contiguous memory range belong to the data structure. As indicated by the name bitmap, the bitmap information may comprise a bit vector, where a 0 (or 1) indicates that a portion of the contiguous memory range is not allocated to the data structure, and a 1 (or 0) indicates that a portion of the contiguous memory range is allocated to the data structure. For example, a granularity of the bitmap may be variable, i.e. application defined or operating system defined. In some cases, the granularity of the bitmap may be in bytes or kilobytes, in other cases in the range of megabytes or even hundreds of megabytes. To indicate which granularity applies, the information related to the memory performance requirement may comprise information about a granularity of the bitmap information. The location of the data structure within the memory may be further specified using the information about the granularity of the bitmap information. The granularity of the non-contiguous location of the data structure within the contiguous memory range may be specified by the information about the granularity of the bitmap information. The information about the granularity of the data structure may specify a granularity level (of a plurality of possible granularity levels) of the bitmap information. The information about the granularity may enable reducing the size of the information about the bitmap. Alternatively, other approaches or methods may be taken to specify the non-contiguous location of the data structure within the contiguous memory.

Figure 2A:
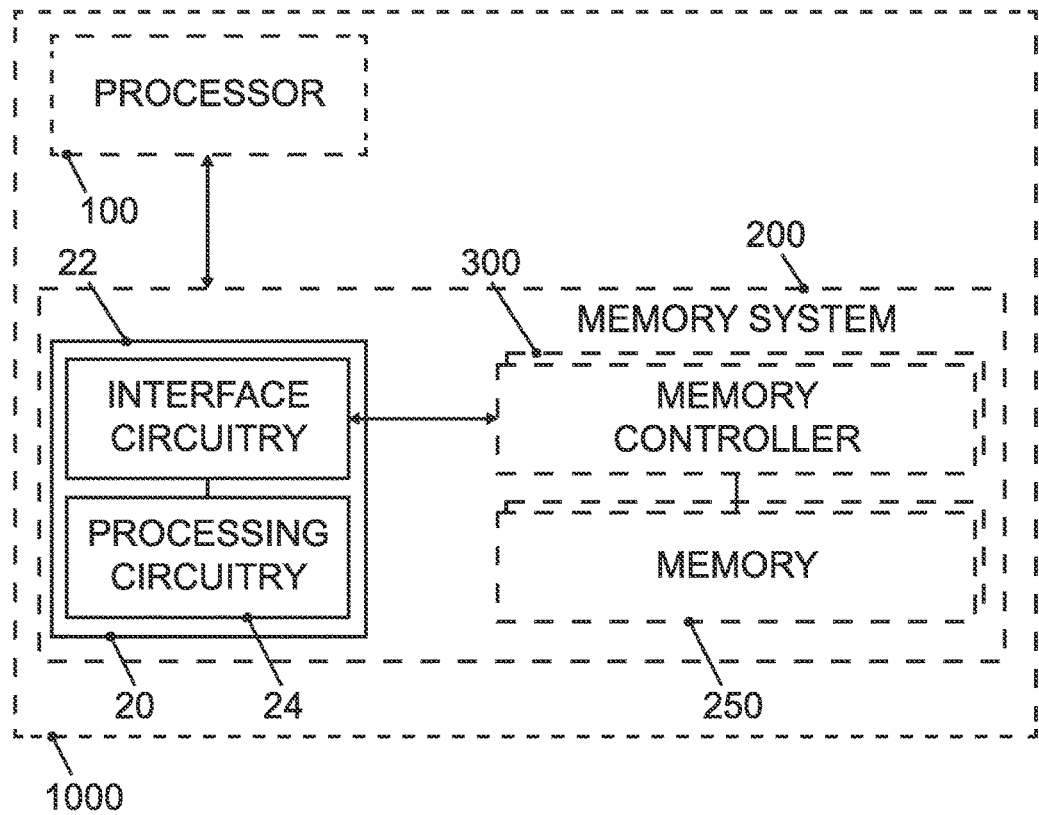
FIG. 2a shows a block diagram of an example of a memory performance controller apparatus or of a memory performance controller device.

The interface circuitry or means for communicating 12 (and/or interface circuitry or means for communicating 22/32 of FIGS. 2a and/or 3a) may correspond to one or more inputs and/or outputs for receiving and/or transmitting information, which may be in digital (bit) values according to a specified code, within a module, between modules or between modules of different entities. For example, the interface circuitry or means for communicating 12; 22; 32 may comprise interface circuitry configured to receive and/or transmit information. For example, the interface circuitry or means for communicating 12; 22; 32 may be configured to communicate via a computer-system processor interconnect, such as QuickPath Interconnect or Ultra Path Interconnect (UPI), or Hypertransport. Additionally or alternatively, the interface circuitry or means for communicating 12; 22; 32 may be configured to communicate via a computer-system internal network or network fabric, e.g. via a Network Interface Card (NIC), which may be implicitly comprised in another component. The interface circuitry/means for communicating 12; 22; 32 is suitable (and/or configured to) communicating/communicating with the other components of the computer system. For example, in case of the interface circuitry/means for communicating of the processor apparatus/device, the interface circuitry or means for communicating may be configured to communicate with the Processor 100 and/or with the memory system 200, e.g. with the memory performance controller apparatus or device 20, with the one or more memory controllers 300 and/or with the memory 250. In case of the interface circuitry/means for communicating of the memory performance controller apparatus or device 30, the interface circuitry or means for communicating may be configured to communicate with the Processor 100 and/or with the one or more memory controllers 300. In case of the interface circuitry/means for communicating of the memory controller apparatus 30, the interface circuitry or means for communicating may be configured to communicate with the Processor 100, with the memory performance controller apparatus or device 20 and/or with the memory 250.

In examples, the processing circuitry or means for processing 14 (and/or processing circuitry or means for processing 24/34 of FIGS. 2a and/or 3a) may be implemented using one or more processing units, one or more processing devices, any means for processing, such as a processor, a computer or a programmable hardware component being operable with accordingly adapted software. In other words, the described function of the processing circuitry or means for processing 14; 24; 34 may as well be implemented in software, which is then executed on one or more programmable hardware components. Such hardware components may comprise a general purpose processor, a Digital Signal Processor (DSP), a micro-controller, etc.

More details and aspects of the processor apparatus or device 10 and/or the corresponding method are mentioned in connection with the proposed concept or one or more examples described above or below (e.g. FIGS. 2a to 7). The processor apparatus or device 10 and/or the corresponding method may comprise one or more additional optional features corresponding to one or more aspects of the proposed concept or one or more examples described above or below.

FIG. 2a shows a block diagram of an example of a memory performance controller apparatus 20 or of a memory performance controller device 20. The memory performance controller apparatus or device 20 is suitable for controlling a performance of an access to a data structure stored within a memory of a computer system 1000. The components of the memory performance controller device 20 are defined as component means, which correspond to the respective structural components of the memory performance controller apparatus 20. The memory performance controller apparatus/device 20 comprises interface circuitry/means for communicating 22 for communicating with other components of the computer system. The memory performance controller apparatus/device 20 comprises processing circuitry/means for processing 24 that is coupled to the interface circuitry/means for communicating 22. The processing circuitry is configured to obtain information related to a memory performance requirement of the data structure. The memory performance requirement is a percentile-based memory performance requirement comprising at least a first memory performance requirement valid for a first portion of access operations and a second memory performance requirement valid for a second portion of access operations. The processing circuitry is configured to control a performance of the access to the data structure based on the memory performance requirement of the data structure. FIG. 2a further shows a memory system 200 comprising the memory performance controller apparatus 20. In other words, the memory performance controller apparatus 20 may be a part of the memory system 200. In some examples, the memory system 200 may further comprise one or more memory controllers 300. FIG. 2a further shows the computer system 1000 comprising a processor 100 and the memory system 200.

Figure 2B:
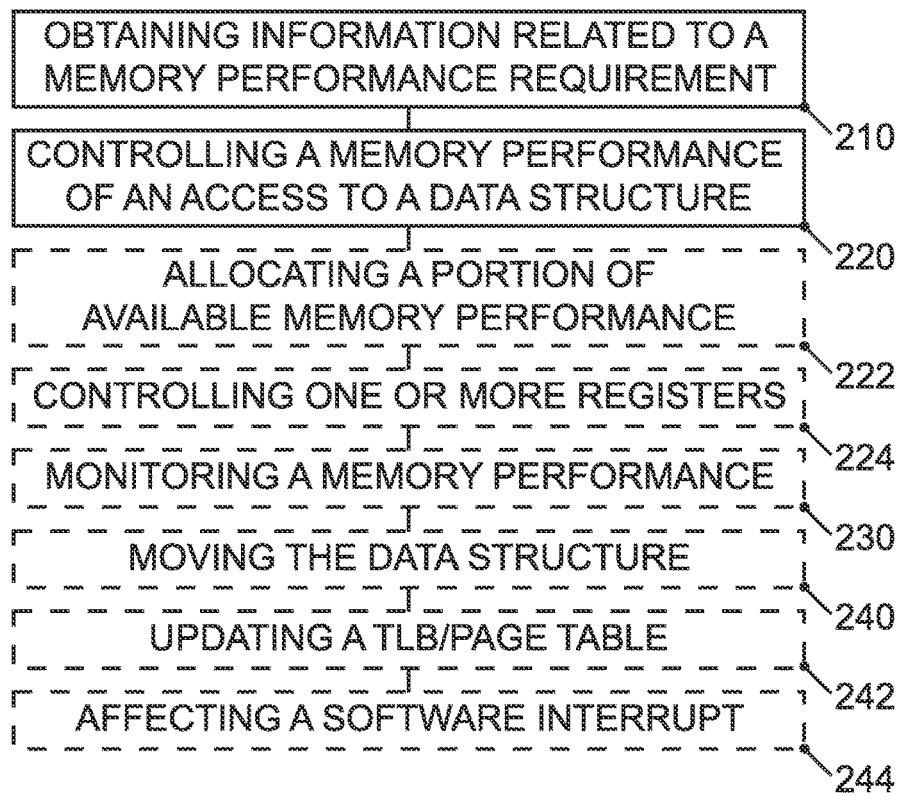
FIG. 2b shows a flow chart of an example of a memory performance controller method.

FIG. 2b shows a flow chart of an example of a (corresponding) memory performance controller method. The memory performance controller method is suitable for controlling a performance of an access to a data structure stored within a memory of a computer system. The method comprises obtaining 210 information related to a memory performance requirement of the data structure. The memory performance requirement is a percentile-based memory performance requirement comprising at least a first memory performance requirement valid for a first portion of access operations and a second memory performance requirement valid for a second portion of access operations. The method comprises controlling 220 a performance of the access to the data structure based on the memory performance requirement of the data structure. For example, the memory performance controller method may be executed by the memory system 200 of the computer system 1000, e.g. by the memory performance controller apparatus/device 20.

The following description relates to both the memory performance controller apparatus or device 20 of FIG. 2a and the corresponding method of FIG. 2b.

Examples provide a memory performance controller apparatus, device and method suitable for controlling a performance of an access to a data structure stored within a memory of a computer system. The memory performance controller apparatus, device and method may be a part of the memory system 200 of the computer system 1000 that coordinates an allocation of memory performance for one or more data structures. For example, the memory performance controller apparatus or device 20 may be implemented as independent devices, i.e. the memory system 200 may comprise the memory performance controller apparatus or device 20 in addition to the one or more memory controllers 300 and the memory 250, or the memory performance controller apparatus or device 20 may be implemented as part of at least one of the one or more memory controllers or of the processor 100.

The processing circuitry 14 is configured to obtain the information related to the memory performance requirement of the data structure, e.g. the information related to the memory performance requirement provided by the processor apparatus/device 10 of FIG. 1a. The information related to the memory performance requirement may be obtained (i.e. received via the interface circuitry 12. The information related to the memory performance requirement and the memory performance requirement may be implemented as described in connection with FIGS. 1a and/or 1b. The processing circuitry 24 may be configured to obtain 210 the information related to the memory performance requirement of the data structure from the processor 100 of the computer system. The processor 100 may provide an interface for a software application being executed on the processor 100 that enables the software application to control the memory performance requirement of the data structure.

As described in connection with FIGS. 1a and/or 1b the memory performance requirement is a percentile-based memory performance requirement comprising at least a first memory performance requirement valid for a first portion of access operations and a second memory performance requirement valid for a second portion of access operations. As stated above, if the percentile-based memory performance requirement is implemented as nested or hierarchical memory performance requirement, the second portion may comprise the first portion, and/or the first memory performance requirement may be more stringent than the first memory performance requirement. The memory performance requirement may relate to at least one of a required minimal throughput and a required maximal latency for accessing the data structure.

The processing circuitry 24 is configured to control the performance of the access to the data structure based on the memory performance requirement of the data structure. By controlling the memory system using a percentile-based memory performance requirement, a more flexible control of the memory performance is supported, which enables a memory performance requirement-compliant access to the data structure in homogeneous or heterogeneous memory architectures.

For example, controlling the performance of the access to the data structure may comprise allocating 222 a portion of an available memory performance for the access to the data structure based on the memory performance requirement of the data structure. This may reserve a portion of the available memory performance for the data structure. For example, the portion of the available memory performance may be allocated by setting a (static) performance allocation for access to the data structure at the one or more memory controllers 300. For example, the memory allocation may apply to a (contiguous) memory range of the memory 250 comprising the data structure. Alternatively, the memory allocation may apply to the data structure alone, e.g. using bitmap information to distinguish between data belonging to the data structure and other data.

As described above, the allocation of the memory performance may be performed by the one or more memory controllers. Accordingly, controlling the performance of the access to the data structure may comprise controlling 224 one or more control registers of one or more memory controllers of the memory system 200 based on the memory performance requirement. The control registers may be set to allocate the portion of the available memory performance for the access to the data structure. In this case, the processor 100 may directly access the data structure through the individual one or more memory controllers. In case an access to the data structure is performed through the memory performance controller apparatus or device 20, the allocation of the memory performance according to the memory performance requirement may be performed at the memory performance controller apparatus or device 20, e.g. by prioritizing access to the data structure to meet the memory performance requirement.

To determine whether the memory performance requirement is met, exceeded or violated, the performance of the memory may be evaluated. For example, the processing circuitry 24 may be configured to monitor 230 a memory performance of a portion of the memory comprising the data structure. The monitored memory performance of the portion of the memory comprising the data structure may be compared, by the processing circuitry 24, to determine whether the memory performance requirement is met, exceeded or violated. In addition or alternatively, the monitoring of the memory performance may be used to decide where to store the data structure. For example, the memory 250 may comprise two or more portions of memory, which may have a different general memory performance (e.g. volatile memory and persistent or non-volatile memory), or which may have the same general memory performance, but a different utilization (e.g. two different portions of volatile memory). Based on the available memory performance of the two portions, the data structure may be moved among the two portions.

For example, the memory 250 may be associated with two or more memory controllers 300. The two or more memory controllers may each be configured to control a portion of the memory. The processing circuitry 24 is configured to monitor 230 a memory performance of the memory using the two or more memory controllers of the computer system being associated with the memory. The processing circuitry 24 may be configured to control 220 the performance of the access to the data structure based on the monitored memory performance. By monitoring the actual memory performance of the memory, it may be determined whether the memory performance requirement can be met by the memory. For example, the processing circuitry may be configured to determine the available memory performance (at each of the two or more memory controllers) by monitoring the memory performance of the memory using the two or more memory controllers of the computer system. The portion of the available memory performance may be allocated based on the available memory performance. For example, the available memory performance of (a portion of) the memory may be a part of the general or overall memory performance supported by the (portion of) the memory that is not allocated for other portions of the memory or that is not unavailable due to limitations in a bandwidth of the memory interface.

In some examples, the available memory performance of the memory associated with the two or more memory controllers may (vastly) exceed or violate the memory performance requirement. In this case, the data structure may be moved within the memory (among the memory controllers) to improve the allocation of the memory performance. For example, the processing circuitry 24 may be configured to move 240 the data structure among the memory associated with the two or more memory controllers based on a comparison between the monitored memory performance and the memory performance requirement (e.g. the first and second memory requirements) of the data structure. For example, the data structure may be moved if the memory performance of a portion of the memory that comprises the data structure violates (or greatly exceeds) the memory performance requirement.

To decide where (and/or whether) to move the data structure, the (available) memory performance may be measured or monitored. For example, each portion of the memory may have a different memory performance. For example, the memory may comprise two or more portions that are associated with the two or more memory controllers. One of the two or more portions may be implemented using volatile memory, while another of the two or more portions may be implemented using non-volatile/persistent memory, which has a different general memory performance than the volatile memory. Or both of the two portions may be implemented using volatile memory, and one of the portions may have a higher utilization than the other, leading to a different available memory performance. The processing circuitry 24 may be configured to move 240 the data structure among the memory portions being controlled by two or more memory controllers based on the memory performance of the respective portion of the memory. For example, the data structure may be moved to a portion of the memory that comprises sufficient available memory performance. Additionally or alternatively, the data structure may be moved to a portion of the memory to achieve an improved distribution of memory access operations among different portions of the memory.

After moving the data, the processor and/or the operating system may be informed of the move, so an access to the data structure is restored. For example, the processing circuitry 24 may be configured to update 242 a translation lookaside buffer (TLB) of the processor 100 of the computer system if (i.e. after) the data structure is moved within the memory. Additionally or alternatively, the processing circuitry 24 may be configured to update 242 a page table of the operating system of the computer system if (i.e. after) the data structure is moved within the memory. For example, the update to the TLB or the page table may be triggered by moving the data structure. In some examples, the processing circuitry 24 may be configured to affect (i.e. trigger) 244 a software interrupt if the data structure is moved within the memory. The software interrupt may notify the one or more applications of the change, and restore access to the data structure to have access to the data structure after it is moved.

As described in connection with FIGS. 1a and/or 1b, the data structure may be non-contiguously stored within the memory of the computer system. In such cases, a location of the data structure within the memory may be specified by the information related to the required memory performance of the data structure using information about a contiguous memory range comprising the data structure and using bitmap information that specifies a non-contiguous location of the data structure within the contiguous memory range. The processing circuitry 24 may be configured to adjust 246 the information on the memory range and the bitmap information if the data structure is moved within the memory. For example, the processing circuitry 24 may be configured to update the information on the memory range and the bitmap information based on a new location of the data structure within the memory after moving the data structure. As described in connection with FIGS. 1a and/or 1b, the location of the data structure within the memory may further specified using information about a granularity of the bitmap information. The granularity of the non-contiguous location of the data structure within the contiguous memory range may be specified by the information about the granularity of the bitmap information.

More details and aspects of the memory performance controller apparatus or device 20 and/or the corresponding method are mentioned in connection with the proposed concept or one or more examples described above or below (e.g. FIG. 1a to 1b, 3a to 7). The memory performance controller apparatus or device 20 and/or the corresponding method may comprise one or more additional optional features corresponding to one or more aspects of the proposed concept or one or more examples described above or below.

Figure 3A:
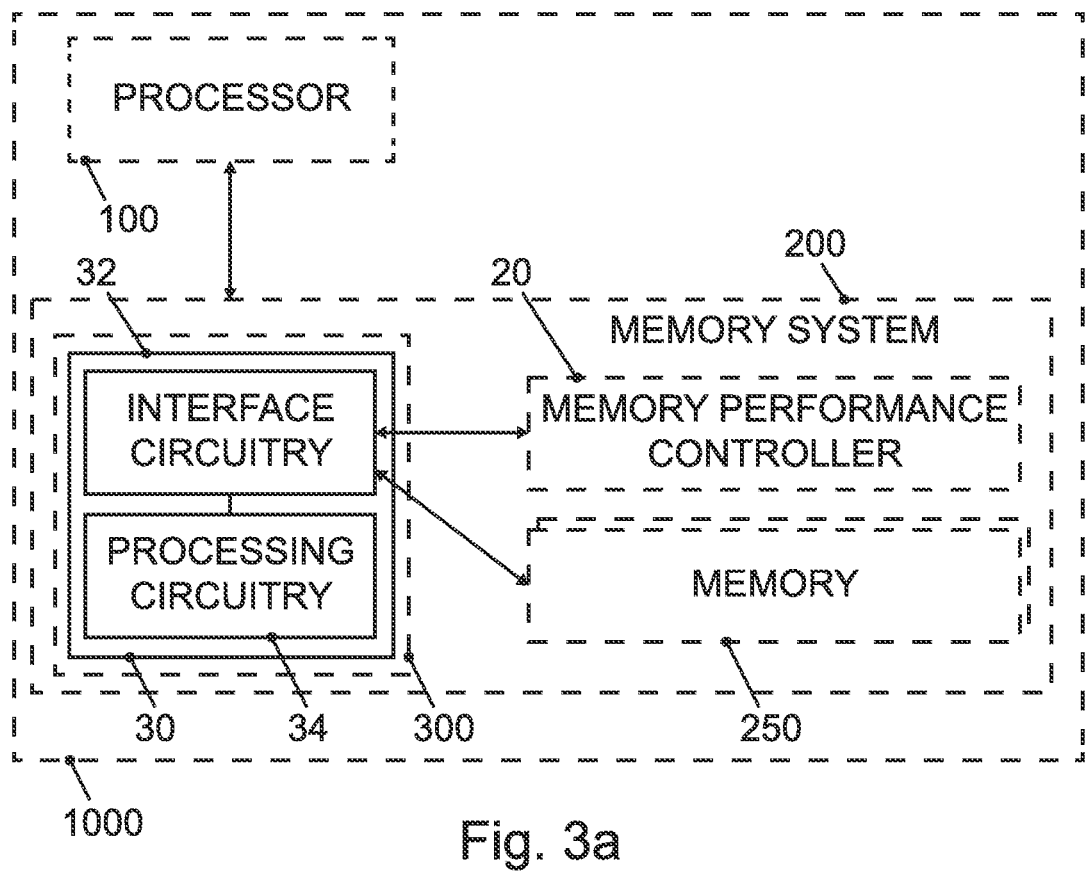
FIG. 3a shows a block diagram of an example of a memory controller apparatus or of a memory controller device for a memory controller.

FIG. 3a shows a block diagram of an example of a memory controller apparatus 30 or of a memory controller device 30 for a memory controller 300 of a computer system 1000. The components of the memory controller device 30 are defined as component means, which correspond to the respective structural components of the memory controller apparatus 30. The memory controller apparatus/device 30 comprises interface circuitry/means for communicating 32 for communicating with other components of the computer system. The memory controller apparatus/device 30 comprises processing circuitry/means for processing 32 that is coupled to the interface circuitry/means for communicating 32. The processing circuitry 34 is configured to determine information about a memory performance of a data structure at least partially being stored within a portion of memory associated with the memory controller. The processing circuitry is configured to provide information about the memory performance to a memory performance controller apparatus/device 20 of the computer system. FIG. 3a further shows the memory controller 300 comprising the memory controller apparatus/device 30. FIG. 3a further shows a memory system 200 for the computer system 1000 comprising the memory performance controller apparatus/device 20 and one or more memory controllers 300. FIG. 3a further shows the computer system comprising a processor 100 and the memory system 200.

Figure 3B:
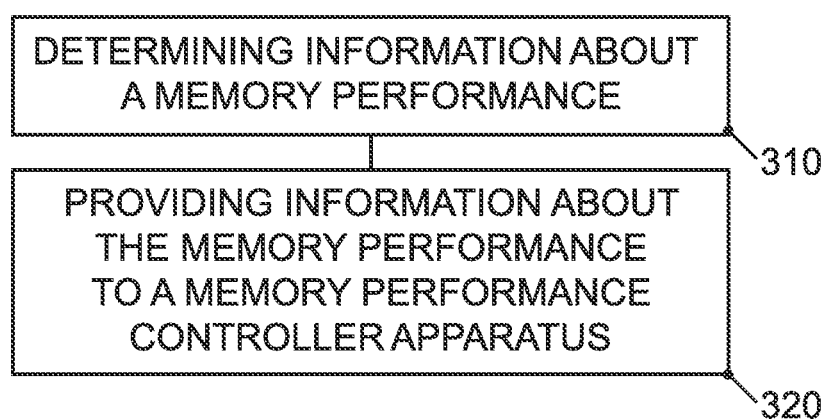
FIG. 3b shows a flow chart of an example of a memory controller method for a memory controller.

FIG. 3b shows a flow chart of an example of a (corresponding) memory controller method for the memory controller 300 of the computer system 1000. The method comprises determining 610 information about a memory performance of a data structure at least partially being stored within a portion of memory associated with the memory controller. The method comprises providing 320 information about the memory performance to a memory performance controller apparatus/device of the computer system. For example, the method may be executed by the memory controller 300.

The following description relates to the memory controller apparatus or device 30 and to the corresponding method.

Some examples relate to a memory controller apparatus, device or method. This memory controller apparatus, device or method may be used to monitor the memory performance of the memory associated with a memory controller comprising the memory controller apparatus or device or executing the corresponding method. For example, the memory performance may be monitored to enable controlling a memory performance of the data structure. The memory controller 300 may be suitable for controlling at least a portion of the memory 250, e.g. by handling access operations to the portion of the memory.

The processing circuitry is configured to determine information about a memory performance of a data structure at least partially being stored within the (portion of the) memory associated with the memory controller. For example, the processing circuitry may be configured to determine at least one of a minimal throughput and a maximal latency of an access to the data structure to determine the information about the memory performance of the data structure.

In some examples, the processing circuitry may be further configured to determine information about a memory performance of the memory if the data structure is not (presently) stored within the portion of the memory associated with the memory, for example to enable a memory performance controller apparatus or device to make a decision on where to move the data structure.

The processing circuitry is configured to provide the information about the memory performance (e.g. of the data structure or of the memory in general) to the memory performance controller apparatus 20 of the computer system, e.g. to the memory performance controller apparatus or device 20 introduced in connection with FIG. 2. In some examples, the information about the memory performance is provided (only) if and/or when the memory performance requirement of the data structure is deemed violated based on the monitoring of the memory performance of the data structure.

More details and aspects of the memory controller apparatus/device 30 and/or the corresponding method are mentioned in connection with the proposed concept or one or more examples described above or below (e.g. FIG. 1a to 2b, 4 to 7). The memory controller apparatus/device 30 and/or the corresponding method may comprise one or more additional optional features corresponding to one or more aspects of the proposed concept or one or more examples described above or below.

At least some example provide percentile based data structure based transparent Service Level Agreements (i.e. memory performance requirements) in multi-tiered memories.

As more memory technologies are designed and included in our system architectures, the more complex can be to write applications that manage the different static and dynamic properties of each of them. In this context, there may be many different software based proposals (i.e profiling based) that depending on the application characteristics decide in what particular memory tier different data structures are stored. Such approaches may ignore the dynamic nature of the platforms (i.e. depending on the utilization of a persistent memory DIMM the amount of available write bandwidth may vary) and may need to be improved for a particular set of memory technologies (i.e. Double Data Rate, Persistent memory etc.). Hardware based approaches such as address space QoS (Quality of Service) or address range based prefetching might also be used. However, the level of granularity is too big and they don't follow a SW/HW (Software/Hardware) co-design approach. This point is especially important application know-how that could be used to optimize this problem is lost once after compilation.

Examples propose to expose a new interface that allows to specify for different data structures (which can be sparsely (i.e. non-contiguously stored) stored in a given address range) what is the expected performance required (i.e. the memory performance requirement) for read and write bandwidth. In some examples, the corresponding logic, e.g. the memory performance controller apparatus or device 20, may be responsible for automatically moving the data objects (i.e. the data structure) to other tiers (i.e. other portions of the memory) in order to satisfy such requirements (can be both upgrading to more or less powerful memory), automatically updating the corresponding TLBs (Translation Lookaside Buffers) and update OS (Operating System) mapping tables transparently.

Figure 4:
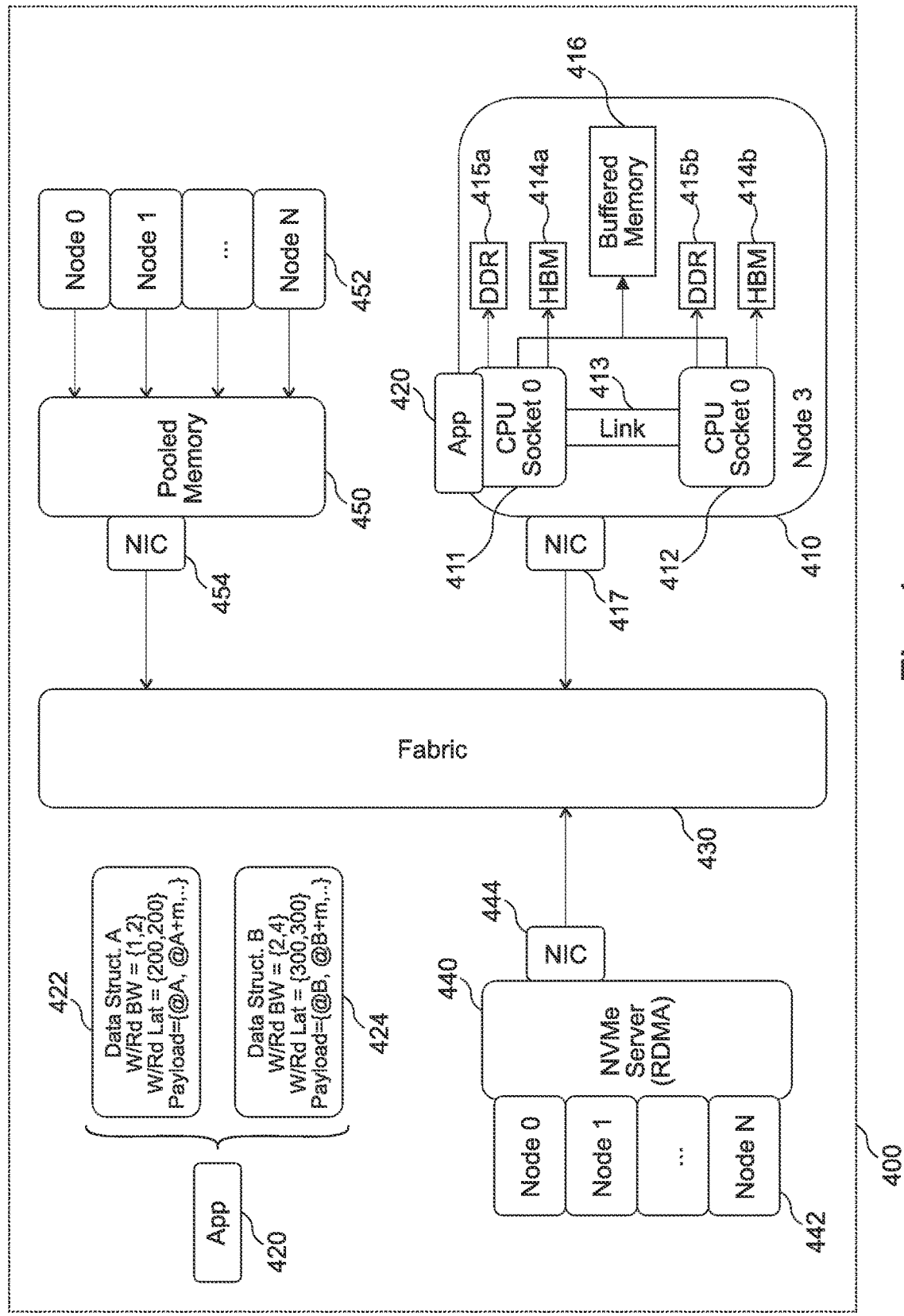
FIG. 4 shows a block diagram of an example of a computer system.

FIG. 4 shows a block diagram of an example of a computer system 400 (which may correspond to computer system 1000), in which such an approach may be implemented. Computer system 400 comprises one or more nodes (presently shown is Node 3) 410. The nodes may comprise one or more processors (for example two Intel® Xeon® processors, but other processors are feasible) 411 and 412 which are connected using a link, such as UPI, 413). The processors have access to memory (DDR 414a and 414b respectively, High Bandwidth Memory (HBM) 415a and 415b respectively, and (shared) Buffered Memory 416. The node is connected to other components of the computer system via a NIC 417 and a network fabric 430. An application 420, which comprises two data structures A 422 and B 424, is being executed on processor 411. Data structure A has memory performance requirements of 1 GByte/s (minimal throughput) at a maximal latency of 200 ns and 2 GByte/s at a maximal latency of 200 ns (for the different percentiles). The payload (i.e. the actual data structure) is defined by an address (@A), and addresses relative to said address (@A+m, . . . ). Data structure B has memory performance requirements of 2 GByte/s (minimal throughput) at a maximal latency of 300 ns and 4 GByte/s at a maximal latency of 400 ns (for the different percentiles). The payload (i.e. the actual data structure) is defined by an address (@B), and addresses relative to said address (@B+n, . . . ). Additional memory is connected to the node 3 via the fabric 430. For example a NVMe Server 440, which is accessible via Remote Direct Memory Access, is connected to the fabric via NIC 444 and comprises Nodes 0 to N 442. Furthermore, Pooled Memory (pooled persistent memory) 450, e.g. implemented using SXP, is connected to the fabric via NIC 454, the Pooled Memory comprising Nodes 0 to N.

In some examples, software based approaches (i.e: using profiling) may be used in order to upfront identify better places of data structures. However they lack of adaptability and dynamicity. Hence they may not work in multi-tenant architectures. But more important they have to be developed for specific memory technologies. Hence, depending on the platform where they land optimizations maybe lost or they may require many different versions depending on the memory technology underneath maybe required (huge costs).

Furthermore, hardware based approaches may be used in order to mitigate this problems in multi-tier architectures. The most relevant aspects are address range based quality of service or pre-fetching or data migration schemes based on address ranges and SLA (Service Level Agreement). The main limitation of some approaches is that the level of granularity is too high and they enforce SLA to particular memory regions (resource reservation) instead of making the memory hierarchy auto-malleable and adaptable to implement the required level performance.

Figure 5:
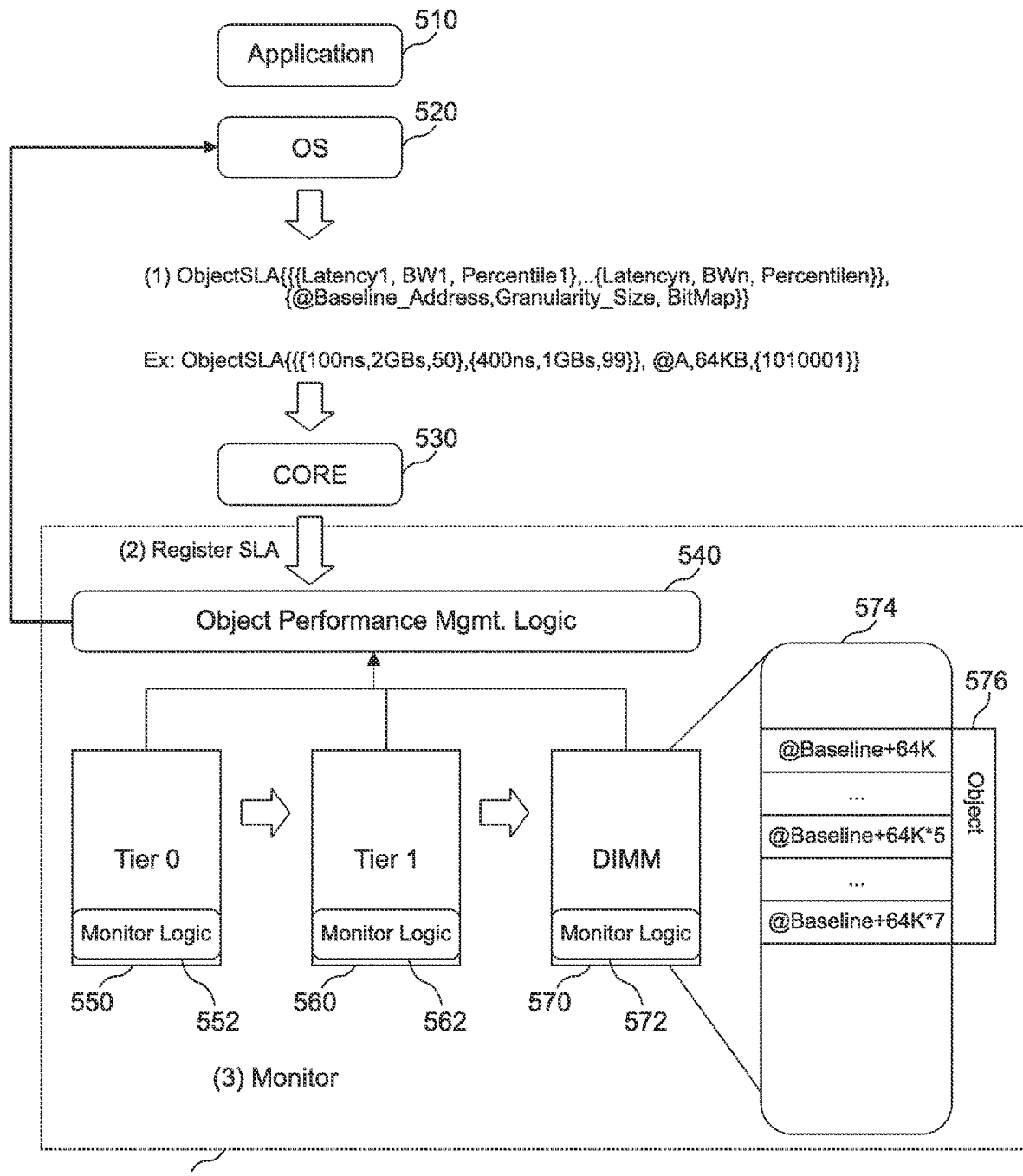
FIG. 5 shows a schematic diagram of an example of a flow of information within a computer system.

FIG. 5 shows a schematic diagram of an example of a flow of information within a computer system. FIG. 5 shows the concepts proposed in examples of the present disclosure. FIG. 5 shows an Application 510, which runs on top of an OS 520. In a first data flow, the OS provides an object SLA of a data structure. In an example, the SLA has a format of {{$Latency_1$, $Bandwidth_1$, $Percentile_1$}, . . . , {$Latency_n$, $Bandwidth_n$, $Percentile_n$}}{@Baseline_Address, Granularity_Size, BitMap}}. This SLA is provided to Core 530 of the Processor, and registered at the Object Performance Management Logic 540 (e.g. the memory performance controller apparatus or device 20). The Object Performance Management Logic 540 is connected to memory tiers 0 (550), 1 (560) and DIMM (e.g. Pooled Memory DIMM or SXP DIMM) (Dual In-Line Memory Module) (570), which each comprise monitoring logic 552; 562; 572 to monitor the performance of the respective memory. The data structure/object 476 is stored within the memory 574 of the DIMM 574, and is defined based on the @Baseline address and increments of the bitmap granularity (64 KB in the present case). The Object Performance Management Logic 540 has a feedback path to the OS 520, e.g. to adjust the page tables to reflect the new location of the data structure.

The memory architecture may be extended with a new interface (e.g. provided by the processor apparatus/device) and the corresponding logic that allows to define service level agreement in the following way:

The SLA (i.e. the memory performance requirement) is associated to a data structure that can be defined by a base address, bit map that mapped to a contiguous address spaces divided in chunks (e.g. 1 indicates that that chunk represented by that bit belongs to the data structure) and what is the granularity of that bit-map chunks (for example every bit representing chunks of 1 KB or 100 MB).

The SLA may be defined in percentile based semantic. For example, as shown in the example below, an application may require that the access to the data structure should have 50% of the time less than 100 ns (e.g. the first memory performance requirement) and 2 or more GB/S and 99% of the time less than 400 ns and 2 GB/s (e.g. the second memory performance requirement) (ObjectSLA({{100 ns, 2 GBs, 50}, {400 ns, 1 GBs, 99}}, {@A,64 KB,{1010001}}}).

In short, in order to implement the described method, examples propose to extend:

a CPU interface (e.g. the interface for controlling a memory performance requirement of a data structure stored within a memory of the computer system) to allow the SW stack to actually use the described functionality.

The memory hierarchy may be extended with a new component (e.g. with the memory performance controller apparatus or device 20) that is responsible to move data from different memory hierarchies when SLA are violated or there is an option to move data structures to improve resource and system utilization. The logic may use memory telemetry (e.g. monitoring the memory performance of the data structure) and information about the memory technology on a particular memory tier to decide the new memory tier. When data is moved this logic may update the TLB, the new bit-mask and the corresponding base address as well as update the OS page tables with the new PA (Physical Address) mapping.

Each memory controller may extended with a new monitoring logic (e.g. provided by the memory controller apparatus or device) that is responsible to track each of the objects when hosted in the memory tier that they are managing.

In other words, at least some examples extend an architecture of computer systems in three main areas: (1) CPU (Central Processing Unit) Interface (e.g. via the processor apparatus/device); (2) Monitoring elements inside the memory controllers (e.g. via the memory controller apparatus/device); (3) and data migration logic (e.g. via the memory performance controller apparatus or device).

For example, the CPU (e.g. the Processor) may expose a new interface that allows to use the method described in the present disclosure. This interface can be exposed via a new instruction exposed by the CPU or a new a new feature that can be used by configuring a set of new MSR (Machine State Register). As already mentioned, exemplary parameters for the interface could be:

ObjectSLA({{Latency$_1$, BW$_1$, Percentile$_1$}, . . . {Latency$_n$, BW$_n$, Percentile$_n$}}, {@Baseline_Address,Granularity_Size, BitMap})

The SLA may be associated with a data structure that can be defined by a base address, bit map that indicates in a contiguous address space from the base address, what ranges belong to that data structure, and what is the granularity of that bit-map (for example every bit representing chunks of 1 KB or 100 MB).

The SLA may be defined in percentile based semantic. For example, as shown above, an application may require that the access to the data structure should have 50% of the time less than 100 ns and 2 or more GB/S and 99% of the time less than 400 ns and 2 GB/s.

Examples further provide monitoring logic at the memory controllers. Each of the memory controllers may include a new element (e.g. the memory controller apparatus or device) that is responsible to track the access to a particular object hosted in the current tier. Note that it may happen that in a given memory tier and object is distributed across different channels (hence managed by different memory controllers). In this last case different memory controllers may responsible to monitor different parts of the object.

This monitoring logic may include:

A new interface and the corresponding configuration logic that allows to configure a particular monitor for a particular agent. This logic may store monitors in a configuration table mapped to the corresponding application that has registered that monitor.

A monitoring logic that is responsible to actually track the different memory ranges associated to a particular object based on the earlier introduced definition. This logic may trigger an exception when The SLA definition is not satisfied (i.e: a particular percentile definition is not achieved)

The data structure is far from using the provided SLA. In this case there is room to move it to another memory location (maybe less expensive).

The callback logic which may communicate to the Object Performance Mgmt. Logc when the object needs to be moved to another memory tier.

Figure 6:
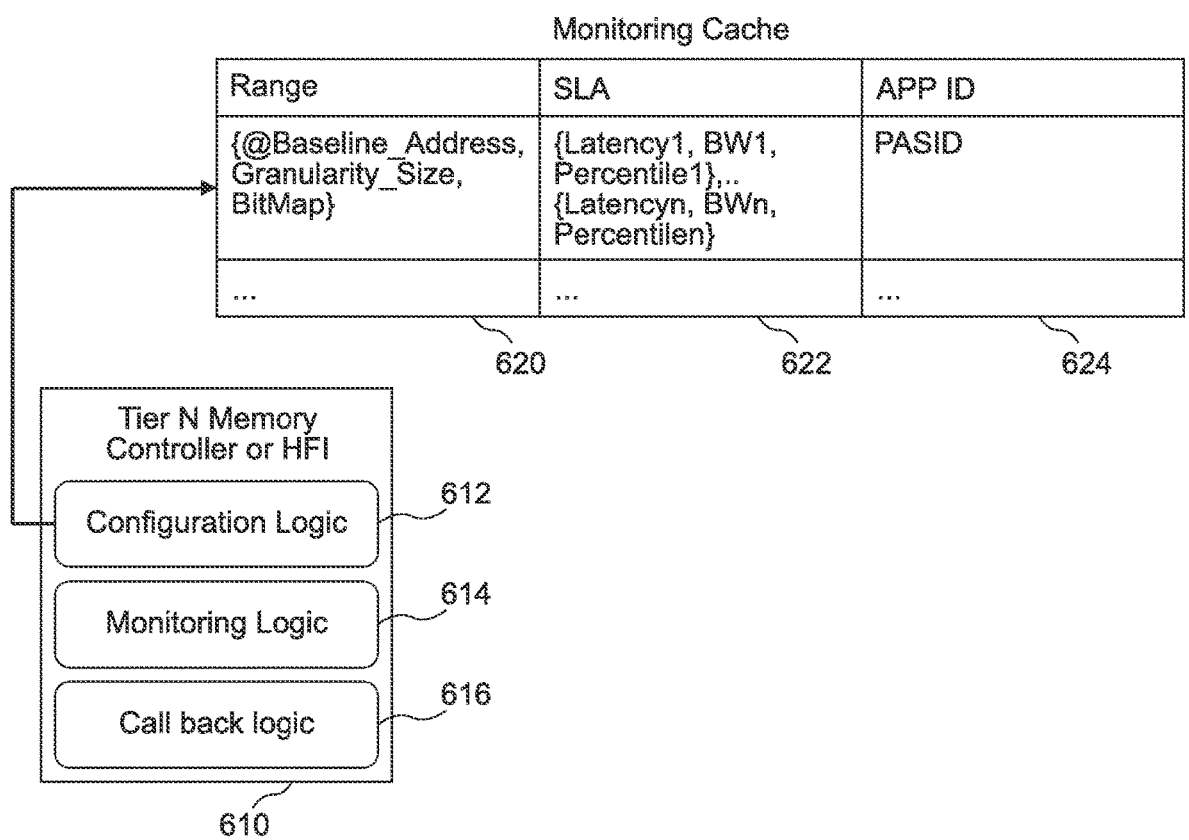
FIG. 6 shows a schematic diagram of a monitoring logic of a memory controller.

FIG. 6 shows a schematic diagram of a monitoring logic 614 (e.g. the memory controller apparatus/device 30) of a memory controller 610. The memory controller further comprises configuration logic 612 and callback logic 614, which may also be implemented by the he memory controller apparatus/device 30. The memory controller 610 is the tier N memory controller or host fabric interface (HFI). The configuration logic comprises a monitoring cache, in which an entry comprises a range 620 ({@Baseline_address, Granularity_Size}), the corresponding SLA 622 ({{Latency$_1$, BW$_1$, Percentile$_1$}, . . . {Latency$_n$, BW$_n$, Percentile$_n$}}), and the identifier 624 of the application having access to the data structure (PASID).

Examples further provide an object performance management logic (e.g. the memory performance controller apparatus or device 2). This is the logic that is responsible to orchestrate the different monitors in the memory hierarchies, perform data object movement when needed and re-configure the corresponding parts of the system to keep the application using the proper data. As shown in the following figure, the following elements are included:

- A component that is responsible to expose to the interface that can be used to configure a particular object service level agreement with the semantics already discussed.
- A component that is responsible to process and receive the callbacks from the different memory tiers. This logic may proxy all the call backs to the Data Movement logic.
- The data movement logic may be responsible to actually perform data movement when a particular SLA is not met or there is an opportunity to actually consolidate a data structure into another memory hierarchy (i.e. that consumes less power) to make the system more efficient. This logic may receive telemetry logic (e.g. the information about the memory performance) from each of the memory tiers that is used to actually decide to what memory tier data structures are being used. When a call back is received this logic may:
  - Based on data telemetry form each of the memory tiers and their corresponding memory technology (i.e: static read and write latencies and peak read and write bandwidth) to what memory tier the data structure needs to be used.
  - It may notify to the core or cores where the application is running to actually hold requests issued to this memory structure.
  - It may move the different chunks from the original memory tier to the target memory tier. Note that it may use the bit map to fetch the original data and may update it corresponding to the new location where data is stored in to the new memory tier.
  - It may update the corresponding TLBs and the operating system page tables in order to be sure that new accesses to the data structure are mapped in to the right physical address space.

It may notify to the core or cores that the data structure is useable again.

FIG. 7 shows a schematic diagram of an object performance management logic in a computer system. Wherever possible, the reference signs used in FIG. 1a have been used to denote the components. FIG. 7 shows a computer system 100 comprising a processor 100 having cores 712; 718 each having a TLB 714; 718). FIG. 7 further shows an OS 760 being executed on the processor 100, and an application 750 running on the OS. FIG. 7 further shows a memory system 200 comprising the Object Performance Management Logic 20, a tier 1 memory controller or HFI, and a tier N memory controller of HFI (both memory controllers comprising configuration logic 732/742, monitoring logic 734/744, and call back logic 736/746). The Object Performance Management Logic 20 comprises an interface 722 connected to the configuration logic of the memory controllers, a data movement module 724, a system reconfiguration module 726 that is connected to the cores and the OS, and call back processing logic which receives callbacks from the call back logic of the memory controllers.

To access the interface provided by the CPU, compilers may implement the respective commands. Compilers are often capable of identifying critical structures. They could be expanded to include the concept of different quality of service per structure (i.e: qualitative=LOW, MED, HIGH). For example, fingerprinting techniques may be used to actually dynamically (during runtime) identify structures suffering from performance limitation on the current tier and move appropriate tier.

On the hardware side, examples may use an acceleration IP (Intellectual Property) block where this algorithms can be implemented using standard coding (keeping this as part of the CPU or platform architecture). In this case, the caching agents may forward the addresses being accessed by each process id. This accelerated IP may implement heat map structures, system address decoder and moving logic. To decrease a complexity, data structures/objects may be restricted to being placed in a contiguous address space or an amount of objects to be tracked in a particular tier may be restricted.

The aspects and features mentioned and described together with one or more of the previously detailed examples and figures, may as well be combined with one or more of the other examples in order to replace a like feature of the other example or in order to additionally introduce the feature to the other example.

Example 1 relates to a processor apparatus (10) for a processor (100) of a computer system (1000), the apparatus (10) comprising interface circuitry (12) for communicating with other components of the computer system. The processor apparatus (10) comprises processing circuitry (14) configured to provide an interface for controlling a memory performance requirement of a data structure stored within a memory of the computer system, the memory performance requirement being a percentile-based memory performance requirement comprising at least a first memory performance requirement valid for a first portion of access operations and a second memory performance requirement valid for a second portion of access operations, and control a memory system (200) of the computer system to provide the memory performance indicated by the memory performance requirement in response to an instruction obtained via the interface for controlling the memory performance requirement of the data structure.

In Example 2, the subject matter of example 1 or any of the Examples described herein may further include, that the second portion comprises the first portion, and/or wherein the first memory performance requirement is more stringent than the first memory performance requirement.

In Example 3, the subject matter of one of the examples 1 to 2 or any of the Examples described herein may further include, that the interface for controlling the memory performance requirement of the data structure is provided as part of an instruction set of the processor (100).

In Example 4, the subject matter of one of the examples 1 to 3 or any of the Examples described herein may further include, that in order to control the memory system (200) of the computer system to provide the memory performance indicated by the memory performance requirement, the processing circuitry (14) is configured to provide information related to the memory performance requirement of the data structure to the memory system (200) of the computer system to control the memory system (200) of the computer system.

In Example 5, the subject matter of one of the examples 1 to 4 or any of the Examples described herein may further include, that controlling the memory system (200) comprises controlling one or more control registers of one or more memory controllers of the memory system (200) based on the memory performance requirement.

In Example 6, the subject matter of one of the examples 1 to 5 or any of the Examples described herein may further include, that in order to control the memory system (200) of the computer system to provide the memory performance indicated by the memory performance requirement, the processing circuitry (14) is configured to provide information related to the memory performance requirement of the data structure to a memory performance controller apparatus (20) of the memory system (200).

In Example 7, the subject matter of one of the examples 1 to 6 or any of the Examples described herein may further include, that the data structure is non-contiguously stored within the memory of the computer system.

In Example 8, the subject matter of example 7 or any of the Examples described herein may further include, that a location of the data structure within the memory is specified by the information related to the required memory performance of the data structure using information about a contiguous memory range comprising the data structure and using bitmap information that specifies a non-contiguous location of the data structure within the contiguous memory range.

In Example 9, the subject matter of example 8 or any of the Examples described herein may further include, that the location of the data structure within the memory is further specified using information about a granularity of the bitmap information, the granularity of the noncontiguous location of the data structure within the contiguous memory range being specified by the information about the granularity of the bitmap information.

In Example 10, the subject matter of one of the examples 1 to 9 or any of the Examples described herein may further include, that the memory performance requirement relates to at least one of a required minimal throughput and a required maximal latency for accessing the data structure.

Example 11 relates to a memory performance controller apparatus (20) for controlling a performance of an access to a data structure stored within a memory of a computer system, the apparatus comprising interface circuitry (22) for communicating with other components of the computer system. The memory performance controller apparatus (20) comprises processing circuitry (24) configured to obtain information related to a memory performance requirement of the data structure, the memory performance requirement being a percentile-based memory performance requirement comprising at least a first memory performance requirement valid for a first portion of access operations and a second memory performance requirement valid for a second portion of access operations, and control a performance of the access to the data structure based on the memory performance requirement of the data structure.

In Example 12, the subject matter of example 11 or any of the Examples described herein may further include, that controlling the performance of the access to the data structure comprises allocating a portion of an available memory performance for the access to the data structure based on the memory performance requirement of the data structure.

In Example 13, the subject matter of one of the examples 11 to 12 or any of the Examples described herein may further include, that controlling the performance of the access to the data structure comprises controlling one or more control registers of one or more memory controllers of the memory system (200) based on the memory performance requirement.

In Example 14, the subject matter of one of the examples 11 to 13 or any of the Examples described herein may further include, that the processing circuitry (24) is configured to monitor a memory performance of the memory using two or more memory controllers of the computer system being associated with the memory, and to control the performance of the access to the data structure based on the monitored memory performance.

In Example 15, the subject matter of example 14 or any of the Examples described herein may further include, that the two or more memory controllers are each configured to control a portion of the memory, wherein the processing circuitry (24) is configured to move the data structure among the memory associated with the two or more memory controllers based on a comparison between the monitored memory performance and the memory performance requirement of the data structure.

In Example 16, the subject matter of example 15 or any of the Examples described herein may further include, that each portion of the memory has a different memory performance, wherein the processing circuitry (24) is configured to move the data structure among the memory portions being controlled by two or more memory controllers based on the memory performance of the respective portion of the memory.

In Example 17, the subject matter of one of the examples 15 to 16 or any of the Examples described herein may further include, that the processing circuitry (24) is configured to update a translation lookaside buffer of a processor (100) of the computer system and/or a page table of an operating system of the computer system if the data structure is moved within the memory.

In Example 18, the subject matter of one of the examples 15 to 17 or any of the Examples described herein may further include, that the processing circuitry (24) is configured to affect a software interrupt if the data structure is moved within the memory.

In Example 19, the subject matter of one of the examples 11 to 18 or any of the Examples described herein may further include, that the processing circuitry (24) is configured to obtain the information related to the memory performance requirement of the data structure from a processor (100) of the computer system.

In Example 20, the subject matter of one of the examples 11 to 19 or any of the Examples described herein may further include, that the data structure is non-contiguously stored within the memory of the computer system.

In Example 21, the subject matter of example 20 or any of the Examples described herein may further include, that a location of the data structure within the memory is specified by the information related to the required memory performance of the data structure using information about a contiguous memory range comprising the data structure and using bitmap information that specifies a non-contiguous location of the data structure within the contiguous memory range, wherein the processing circuitry (24) is configured to adjust the information on the memory range and the bitmap information if the data structure is moved within the memory.

In Example 22, the subject matter of example 21 or any of the Examples described herein may further include, that the location of the data structure within the memory is further specified using information about a granularity of the bitmap information, the granularity of the non-contiguous location of the data structure within the contiguous memory range being specified by the information about the granularity of the bitmap information.

In Example 23, the subject matter of one of the examples 11 to 22 or any of the Examples described herein may further include, that the second portion comprises the first portion, and/or wherein the first memory performance requirement is more stringent than the first memory performance requirement.

In Example 24, the subject matter of one of the examples 11 to 23 or any of the Examples described herein may further include, that the memory performance requirement relates to at least one of a required minimal throughput and a required maximal latency for accessing the data structure.

Example 25 relates to a memory controller apparatus (30) for a memory controller (300) of a computer system (1000), the apparatus comprising interface circuitry (32) for communicating with other components of the computer system. The memory controller apparatus (30) comprises processing circuitry (32) configured to determine information about a memory performance of a data structure at least partially being stored within a portion of memory associated with the memory controller, and provide information about the memory performance to a memory performance controller apparatus (20) of the computer system.

Example 26 relates to a processor (100) comprising the processor apparatus (10) according to one of the examples 1 to 10.

Example 27 relates to a memory controller (300) comprising the memory controller apparatus (30) according to example 25 or 86.

Example 28 relates to a memory system (200) for a computer system, the memory system (200) comprising the memory performance controller apparatus (20) according to one of the examples 11 to 24.

In Example 29, the subject matter of example 28 or any of the Examples described herein may further include, that one or more memory controllers (300) according to example 27.

Example 30 relates to a computer system (1000) comprising the processor (100) according to example 26 and the memory system (200) according to example 29.

Example 31 relates to a processor device (10) for a processor (100) of a computer system (1000), the device (10) comprising means for communicating (12) for communicating with other components of the computer system. The processor device (10) comprises means for processing (14) configured for providing an interface for controlling a memory performance requirement of a data structure stored within a memory of the computer system, the memory performance requirement being a percentile-based memory performance requirement comprising at least a first memory performance requirement valid for a first portion of access operations and a second memory performance requirement valid for a second portion of access operations, and controlling a memory system (200) of the computer system to provide the memory performance indicated by the memory performance requirement in response to an instruction obtained via the interface for controlling the memory performance requirement of the data structure.

In Example 32, the subject matter of example 31 or any of the Examples described herein may further include, that the second portion comprises the first portion, and/or wherein the first memory performance requirement is more stringent than the first memory performance requirement.

In Example 33, the subject matter of one of the examples 31 to 32 or any of the Examples described herein may further include, that the interface for controlling the memory performance requirement of the data structure is provided as part of an instruction set of the processor (100).

In Example 34, the subject matter of one of the examples 31 to 33 or any of the Examples described herein may further include, that in order to control the memory system (200) of the computer system to provide the memory performance indicated by the memory performance requirement, the means for processing (14) is configured for providing information related to the memory performance requirement of the data structure to the memory system (200) of the computer system to control the memory system (200) of the computer system.

In Example 35, the subject matter of one of the examples 31 to 34 or any of the Examples described herein may further include, that controlling the memory system (200) comprises controlling one or more control registers of one or more memory controllers of the memory system (200) based on the memory performance requirement.

In Example 36, the subject matter of one of the examples 31 to 35 or any of the Examples described herein may further include, that in order to control the memory system (200) of the computer system to provide the memory performance indicated by the memory performance requirement, the means for processing (14) is configured for providing information related to the memory performance requirement of the data structure to a memory performance controller device (20) of the memory system (200).

In Example 37, the subject matter of one of the examples 31 to 36 or any of the Examples described herein may further include, that the data structure is non-contiguously stored within the memory of the computer system.

In Example 38, the subject matter of example 37 or any of the Examples described herein may further include, that a location of the data structure within the memory is specified by the information related to the required memory performance of the data structure using information about a contiguous memory range comprising the data structure and using bitmap information that specifies a non-contiguous location of the data structure within the contiguous memory range.

In Example 39, the subject matter of example 38 or any of the Examples described herein may further include, that the location of the data structure within the memory is further specified using information about a granularity of the bitmap information, the granularity of the non-contiguous location of the data structure within the contiguous memory range being specified by the information about the granularity of the bitmap information.

In Example 40, the subject matter of one of the examples 31 to 39 or any of the Examples described herein may further include, that the memory performance requirement relates to at least one of a required minimal throughput and a required maximal latency for accessing the data structure.

Example 41 relates to a memory performance controller device (20) for controlling a performance of an access to a data structure stored within a memory of a computer system, the device comprising means for communicating (22) for communicating with other components of the computer system. The memory performance controller device (20) comprises means for processing (24) configured for obtaining information related to a memory performance requirement of the data structure, the memory performance requirement being a percentile-based memory performance requirement comprising at least a first memory performance requirement valid for a first portion of access operations and a second memory performance requirement valid for a second portion of access operations, and controlling a performance of the access to the data structure based on the memory performance requirement of the data structure.

In Example 42, the subject matter of example 41 or any of the Examples described herein may further include, that controlling the performance of the access to the data structure comprises allocating a portion of an available memory performance for the access to the data structure based on the memory performance requirement of the data structure.

In Example 43, the subject matter of one of the examples 41 to 42 or any of the Examples described herein may further include, that controlling the performance of the access to the data structure comprises controlling one or more control registers of one or more memory controllers of the memory system (200) based on the memory performance requirement.

In Example 44, the subject matter of one of the examples 41 to 43 or any of the Examples described herein may further include, that the means for processing (24) is configured for monitoring a memory performance of the memory using two or more memory controllers of the computer system being associated with the memory, and for controlling the performance of the access to the data structure based on the monitored memory performance.

In Example 45, the subject matter of example 44 or any of the Examples described herein may further include, that the two or more memory controllers are each configured for controlling a portion of the memory, wherein the means for processing (24) is configured for moving the data structure among the memory associated with the two or more memory controllers based on a comparison between the monitored memory performance and the memory performance requirement of the data structure.

In Example 46, the subject matter of example 45 or any of the Examples described herein may further include, that each portion of the memory has a different memory performance, wherein the means for processing (24) is configured for moving the data structure among the memory portions being controlled by two or more memory controllers based on the memory performance of the respective portion of the memory.

In Example 47, the subject matter of one of the examples 45 to 46 or any of the Examples described herein may further include, that the means for processing (24) is configured for updating a translation lookaside buffer of a processor (100) of the computer system and/or a page table of an operating system of the computer system if the data structure is moved within the memory.

In Example 48, the subject matter of one of the examples 45 to 47 or any of the Examples described herein may further include, that the means for processing (24) is configured for affecting a software interrupt if the data structure is moved within the memory.

In Example 49, the subject matter of one of the examples 41 to 48 or any of the Examples described herein may further include, that the means for processing (24) is configured for obtaining the information related to the memory performance requirement of the data structure from a processor (100) of the computer system.

In Example 50, the subject matter of one of the examples 41 to 49 or any of the Examples described herein may further include, that the data structure is non-contiguously stored within the memory of the computer system.

In Example 51, the subject matter of example 50 or any of the Examples described herein may further include, that a location of the data structure within the memory is specified by the information related to the required memory performance of the data structure using information about a contiguous memory range comprising the data structure and using bitmap information that specifies a non-contiguous location of the data structure within the contiguous memory range, wherein the means for processing (24) is configured for adjusting the information on the memory range and the bitmap information if the data structure is moved within the memory.

In Example 52, the subject matter of example 51 or any of the Examples described herein may further include, that the location of the data structure within the memory is further specified using information about a granularity of the bitmap information, the granularity of the non-contiguous location of the data structure within the contiguous memory range being specified by the information about the granularity of the bitmap information.

In Example 53, the subject matter of one of the examples 41 to 52 or any of the Examples described herein may further include, that the second portion comprises the first portion, and/or wherein the first memory performance requirement is more stringent than the first memory performance requirement.

In Example 54, the subject matter of one of the examples 41 to 53 or any of the Examples described herein may further include, that the memory performance requirement relates to at least one of a required minimal throughput and a required maximal latency for accessing the data structure.

Example 55 relates to a memory controller device (30) for a memory controller (300) of a computer system (1000), the device comprising means for communicating, (32) for communicating with other components of the computer system. The memory controller device (30) comprises means for processing (32) configured for determining information about a memory performance of a data structure at least partially being stored within a portion of memory associated with the memory controller, and providing information about the memory performance to a memory performance controller device (20) of the computer system.

Example 56 relates to a processor (100) comprising the processor device (10) according to one of the examples 31 to 40.

Example 57 relates to a memory controller (300) comprising the memory controller device (30) according to example 55 or 87.

Example 58 relates to a memory system (200) for a computer system, the memory system (200) comprising the memory performance controller device (20) according to one of the examples 41 to 54.

In Example 59, the subject matter of example 58 or any of the Examples described herein may further include, that one or more memory controllers (300) according to example 57.

Example 60 relates to a computer system (1000) comprising the processor (100) according to example 56 and the memory system (200) according to example 59.

Example 61 relates to a processor method for a processor (100) of a computer system (1000), the method comprising providing (110) an interface for controlling a memory performance requirement of a data structure stored within a memory of the computer system, the memory performance requirement being a percentile-based memory performance requirement comprising at least a first memory performance requirement valid for a first portion of access operations and a second memory performance requirement valid for a second portion of access operations, and controlling (120) a memory system (200) of the computer system to provide the memory performance indicated by the memory performance requirement in response to an instruction obtained via the interface for controlling the memory performance requirement of the data structure.

In Example 62, the subject matter of example 61 or any of the Examples described herein may further include, that the second portion comprises the first portion, and/or wherein the first memory performance requirement is more stringent than the first memory performance requirement.

In Example 63, the subject matter of one of the examples 61 to 62 or any of the Examples described herein may further include, that the interface for controlling the memory performance requirement of the data structure is provided as part of an instruction set of the processor (100).

In Example 64, the subject matter of one of the examples 61 to 63 or any of the Examples described herein may further include, that in order to control the memory system (200) of the computer system to provide the memory performance indicated by the memory performance requirement, the method comprises providing (122) information related to the memory performance requirement of the data structure to the memory system (200) of the computer system to control the memory system (200) of the computer system.

In Example 65, the subject matter of one of the examples 61 to 64 or any of the Examples described herein may further include, that controlling the memory system (200) comprises controlling (124) one or more control registers of one or more memory controllers of the memory system (200) based on the memory performance requirement.

In Example 66, the subject matter of one of the examples 61 to 65 or any of the Examples described herein may further include, that in order to control the memory system (200) of the computer system to provide the memory performance indicated by the memory performance requirement, the method comprises providing (122) information related to the memory performance requirement of the data structure to a memory performance controller method of the memory system (200).

In Example 67, the subject matter of one of the examples 61 to 66 or any of the Examples described herein may further include, that the data structure is non-contiguously stored within the memory of the computer system.

In Example 68, the subject matter of example 67 or any of the Examples described herein may further include, that a location of the data structure within the memory is specified by the information related to the required memory performance of the data structure using information about a contiguous memory range comprising the data structure and using bitmap information that specifies a non-contiguous location of the data structure within the contiguous memory range.

In Example 69, the subject matter of example 68 or any of the Examples described herein may further include, that the location of the data structure within the memory is further specified using information about a granularity of the bitmap information, the granularity of the non-contiguous location of the data structure within the contiguous memory range being specified by the information about the granularity of the bitmap information.

In Example 70, the subject matter of one of the examples 61 to 69 or any of the Examples described herein may further include, that the memory performance requirement relates to at least one of a required minimal throughput and a required maximal latency for accessing the data structure.

Example 71 relates to a memory performance controller method for controlling a performance of an access to a data structure stored within a memory of a computer system, the method comprising obtaining (210) information related to a memory performance requirement of the data structure, the memory performance requirement being a percentile-based memory performance requirement comprising at least a first memory performance requirement valid for a first portion of access operations and a second memory performance requirement valid for a second portion of access operations. The memory performance controller method comprises controlling (220) a performance of the access to the data structure based on the memory performance requirement of the data structure.

In Example 72, the subject matter of example 71 or any of the Examples described herein may further include, that controlling the performance of the access to the data structure comprises allocating (222) a portion of an available memory performance for the access to the data structure based on the memory performance requirement of the data structure.

In Example 73, the subject matter of one of the examples 71 to 72 or any of the Examples described herein may further include, that controlling the performance of the access to the data structure comprises controlling (224) one or more control registers of one or more memory controllers of the memory system (200) based on the memory performance requirement.

In Example 74, the subject matter of one of the examples 71 to 73 or any of the Examples described herein may further include, that the method comprises monitoring (230) a memory performance of the memory using two or more memory controllers of the computer system being associated with the memory, and controlling (220) the performance of the access to the data structure based on the monitored memory performance.

In Example 75, the subject matter of example 74 or any of the Examples described herein may further include, that the two or more memory controllers are each configured for controlling a portion of the memory, wherein the method comprises moving (240) the data structure among the memory associated with the two or more memory controllers based on a comparison between the monitored memory performance and the memory performance requirement of the data structure.

In Example 76, the subject matter of example 75 or any of the Examples described herein may further include, that each portion of the memory has a different memory performance, wherein the method comprises moving (240) the data structure among the memory portions being controlled by two or more memory controllers based on the memory performance of the respective portion of the memory.

In Example 77, the subject matter of one of the examples 75 to 76 or any of the Examples described herein may further include, that the method comprises updating (242) a translation lookaside buffer of a processor (100) of the computer system and/or a page table of an operating system of the computer system if the data structure is moved within the memory.

In Example 78, the subject matter of one of the examples 75 to 77 or any of the Examples described herein may further include, that the method comprises affecting (244) a software interrupt if the data structure is moved within the memory.

In Example 79, the subject matter of one of the examples 71 to 78 or any of the Examples described herein may further include, that the method comprises obtaining (210) the information related to the memory performance requirement of the data structure from a processor (100) of the computer system.

In Example 80, the subject matter of one of the examples 71 to 79 or any of the Examples described herein may further include, that the data structure is non-contiguously stored within the memory of the computer system.

In Example 81, the subject matter of example 80 or any of the Examples described herein may further include, that a location of the data structure within the memory is specified by the information related to the required memory performance of the data structure using information about a contiguous memory range comprising the data structure and using bitmap information that specifies a non-contiguous location of the data structure within the contiguous memory range, wherein the method comprises adjusting (246) the information on the memory range and the bitmap information if the data structure is moved within the memory.

In Example 82, the subject matter of example 81 or any of the Examples described herein may further include, that the location of the data structure within the memory is further specified using information about a granularity of the bitmap information, the granularity of the non-contiguous location of the data structure within the contiguous memory range being specified by the information about the granularity of the bitmap information.

In Example 83, the subject matter of one of the examples 71 to 82 or any of the Examples described herein may further include, that the second portion comprises the first portion, and/or wherein the first memory performance requirement is more stringent than the first memory performance requirement.

In Example 84, the subject matter of one of the examples 71 to 83 or any of the Examples described herein may further include, that the memory performance requirement relates to at least one of a required minimal throughput and a required maximal latency for accessing the data structure.

Example 85 relates to a memory controller method for a memory controller (300) of a computer system (1000), the method comprising determining (610) information about a memory performance of a data structure at least partially being stored within a portion of memory associated with the memory controller. The memory controller method comprises providing (320) information about the memory performance to a memory performance controller apparatus of the computer system.

In Example 86, the subject matter of example 25 or any of the Examples described herein may further include, that the information about the memory performance is provided to the memory performance controller apparatus of one of the Examples 11 to 24.

In Example 87, the subject matter of example 55 or any of the Examples described herein may further include, that n the information about the memory performance is provided to the memory performance controller apparatus of one of the Examples 41 to 54.

Example 88 relates to a machine readable storage medium including program code, when executed, to cause a machine to perform the method of one of the Examples 61 to 70, the method of one of the Examples 71 to 84, or the method of Example 85.

Example 89 relates to a computer program having a program code for performing the method of one of the Examples 61 to 70, the method of one of the Examples 71 to 84, or the method of Example 85, when the computer program is executed on a computer, a processor, or a programmable hardware component.

Example 90 relates to a machine readable storage including machine readable instructions, when executed, to implement a method or realize an apparatus as claimed in any pending claim or described in any Example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively.

Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A processor apparatus for a processor of a computer system, the apparatus comprising:
    interface circuitry for communicating with other components of the computer system; and
    processing circuitry configured to:
        provide an interface for controlling a memory performance requirement of a data structure stored within a memory of the computer system,
        the memory performance requirement being a percentile-based memory performance requirement comprising at least a first memory performance requirement valid for a first percentage of access operations to the data structure and a second memory performance requirement valid for a second percentage of the access operations to the data structure, and
        control a memory system of the computer system to provide memory performance indicated by the memory performance requirement in response to an instruction obtained via the interface for controlling the memory performance requirement of the data structure,
        wherein the data structure is non-contiguously stored within the memory of the computer system and a location of the data structure within the memory is specified by the information related to the required memory performance of the data structure using information about a contiguous memory range comprising the data structure and using bitmap information that specifies a non-contiguous location of the data structure within the contiguous memory range.

2. The processor apparatus according to claim 1, wherein the second percentage of the access operations includes the first percentage of the access operations, and/or wherein the first memory performance requirement is more stringent than the second memory performance requirement.

3. The processor apparatus according to claim 1, wherein the interface for controlling the memory performance requirement of the data structure is provided as part of an instruction set of the processor.

4. The processor apparatus according to claim 1, wherein, in order to control the memory system of the computer system to provide the memory performance indicated by the memory performance requirement, the processing circuitry is configured to provide information related to the memory performance requirement of the data structure to the memory system of the computer system to control the memory system of the computer system.

5. The processor apparatus according to claim 1, wherein controlling the memory system comprises controlling one or more control registers of one or more memory controllers of the memory system based on the memory performance requirement.

6. The processor apparatus according to claim 1, wherein, in order to control the memory system of the computer system to provide the memory performance indicated by the memory performance requirement, the processing circuitry is configured to provide information related to the memory performance requirement of the data structure to a memory performance controller apparatus of the memory system.

7. The processor apparatus according to claim 1, wherein the location of the data structure within the memory is further specified using information about a granularity of the bitmap information, the granularity of the non-contiguous location of the data structure within the contiguous memory range being specified by the information about the granularity of the bitmap information.

8. The processor apparatus according to claim 1, wherein the memory performance requirement relates to at least one of a required minimal throughput and a required maximal latency for accessing the data structure.

9. A memory performance controller apparatus for controlling a performance of an access to a data structure stored within a memory of a computer system, the apparatus comprising:
    interface circuitry for communicating with other components of the computer system;
    processing circuitry configured to:
        obtain information related to a memory performance requirement of the data structure,
        the memory performance requirement being a percentile-based memory performance requirement comprising at least a first memory performance requirement valid for a first percentage of access operations to the data structure and a second memory performance requirement valid for a second percentage of the access operations to the data structure, and
        control a performance of the access to the data structure based on the memory performance requirement of the data structure,
        wherein the data structure is non-contiguously stored within the memory of the computer system and a location of the data structure within the memory is specified by the information related to the required memory performance of the data structure using information about a contiguous memory range comprising the data structure and using bitmap information that specifies a non-contiguous location of the data structure within the contiguous memory range,
        wherein the processing circuitry is configured to adjust the information on the memory range and the bitmap information if the data structure is moved within the memory.

10. The memory performance controller apparatus according to claim 9, wherein controlling the performance of the access to the data structure comprises allocating a portion of an available memory performance for the access to the data structure based on the memory performance requirement of the data structure.

11. The memory performance controller apparatus according to claim 9, wherein controlling the performance of the access to the data structure comprises controlling one or more control registers of one or more memory controllers of the memory system based on the memory performance requirement.

12. The memory performance controller apparatus according to claim 9, wherein the processing circuitry is configured to monitor a memory performance of the memory using two or more memory controllers of the computer system being associated with the memory, and to control the performance of the access to the data structure based on the monitored memory performance.

13. The memory performance controller apparatus according to claim 12, wherein the two or more memory controllers are each configured to control a portion of the memory, wherein the processing circuitry is configured to move the data structure among the memory associated with the two or more memory controllers based on a comparison between the monitored memory performance and the memory performance requirement of the data structure.

14. The memory performance controller apparatus according to claim 13, wherein each portion of the memory has a different memory performance, wherein the processing circuitry is configured to move the data structure among the memory portions being controlled by two or more memory controllers based on the memory performance of the respective portion of the memory.

15. The memory performance controller apparatus according to claim 13, wherein the processing circuitry is configured to update a translation lookaside buffer of a processor of the computer system and/or a page table of an operating system of the computer system if the data structure is moved within the memory.

16. The memory performance controller apparatus according to claim 13, wherein the processing circuitry is configured to affect a software interrupt if the data structure is moved within the memory.

17. The memory performance controller apparatus according to claim 9, wherein the processing circuitry is configured to obtain the information related to the memory performance requirement of the data structure from a processor of the computer system.

18. The memory performance controller apparatus according to claim 9, wherein the location of the data structure within the memory is further specified using information about a granularity of the bitmap information, the granularity of the non-contiguous location of the data structure within the contiguous memory range being specified by the information about the granularity of the bitmap information.

19. The memory performance controller apparatus according to claim 9, wherein the second percentage of the access operations include the first percentage of the access operations, and/or wherein the first memory performance requirement is more stringent than the second memory performance requirement.

20. The memory performance controller apparatus according to claim 9, wherein the memory performance requirement relates to at least one of a required minimal throughput and a required maximal latency for accessing the data structure.

21. A memory controller apparatus for a memory controller of a computer system, the apparatus comprising:
interface circuitry for communicating with other components of the computer system; and
processing circuitry configured to:
determine information about a memory performance of a data structure at least partially being stored within a portion of memory associated with the memory controller, wherein the information about the memory performance is determined based on a memory performance requirement and the memory performance requirement is a percentile-based memory performance requirement comprising at least a first memory performance requirement valid for a first percentage of access operations to the data structure and a second memory performance requirement valid for a second percentage of the access operations to the data structure, and
provide the information about the memory performance to a memory performance controller apparatus of the computer system,
wherein the data structure is non-contiguously stored within the memory of the computer system and a location of the data structure within the memory is specified by the information related to the required memory performance of the data structure using information about a contiguous memory range comprising the data structure and using bitmap information that specifies a non-contiguous location of the data structure within the contiguous memory range.

* * * * *